(12) United States Patent
Ono et al.

(10) Patent No.: US 8,922,816 B2
(45) Date of Patent: Dec. 30, 2014

(54) INFORMATION PROCESSING APPARATUS, CONTROL METHOD THEREOF, AND STORAGE MEDIUM STORING PROGRAM

(71) Applicant: Canon Kabushiki Kaisha, Tokyo (JP)

(72) Inventors: Atsuko Ono, Kagoshima (JP); Yusuke Hattori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/771,974

(22) Filed: Feb. 20, 2013

(65) Prior Publication Data
US 2013/0235421 A1 Sep. 12, 2013

(30) Foreign Application Priority Data

Mar. 7, 2012 (JP) ................................. 2012-050950

(51) Int. Cl.
G06F 3/12 (2006.01)
G06K 15/00 (2006.01)
H04N 1/00 (2006.01)
G06K 15/02 (2006.01)

(52) U.S. Cl.
CPC ............ *G06K 15/02* (2013.01); *H04N 1/00127* (2013.01)
USPC .......... 358/1.15; 358/1.13; 358/1.16; 358/1.6

(58) Field of Classification Search
USPC ............... 358/1.15, 1.16, 1.13, 1.6, 448, 474, 358/442, 505, 501, 508; 709/203, 230, 223, 709/222, 227; 710/5, 4, 39, 36, 12, 18, 24, 710/33

See application file for complete search history.

(56) References Cited

U.S. PATENT DOCUMENTS

| 2003/0048303 | A1* | 3/2003 | Mesa et al. ..................... 345/771 |
| 2010/0315675 | A1* | 12/2010 | Yagi .............................. 358/1.15 |
| 2011/0122435 | A1* | 5/2011 | Nishiyama .................... 358/1.15 |
| 2012/0162711 | A1* | 6/2012 | Shibao ......................... 358/1.15 |
| 2012/0257233 | A1* | 10/2012 | Kishida ....................... 358/1.13 |

FOREIGN PATENT DOCUMENTS

JP 2007-219956 A 8/2007
JP 2008-034923 A 2/2008

\* cited by examiner

*Primary Examiner* — Ngon Nguyen
(74) *Attorney, Agent, or Firm* — Fitzpatrick Cella Harper & Scinto

(57) ABSTRACT

When a notification, indicating that a read-start instruction is inputted in a reading apparatus that supports event push scanning, is received through a network, read-setting of read operation corresponding to the read-start instruction is acquired from the reading apparatus through a network, in response to the received notification. An instruction is given to the reading apparatus through the network to read an image in accordance with the acquired read-setting and transmit read image data generated by the reading, using a predetermined scanner driver.

20 Claims, 14 Drawing Sheets

F I G. 1
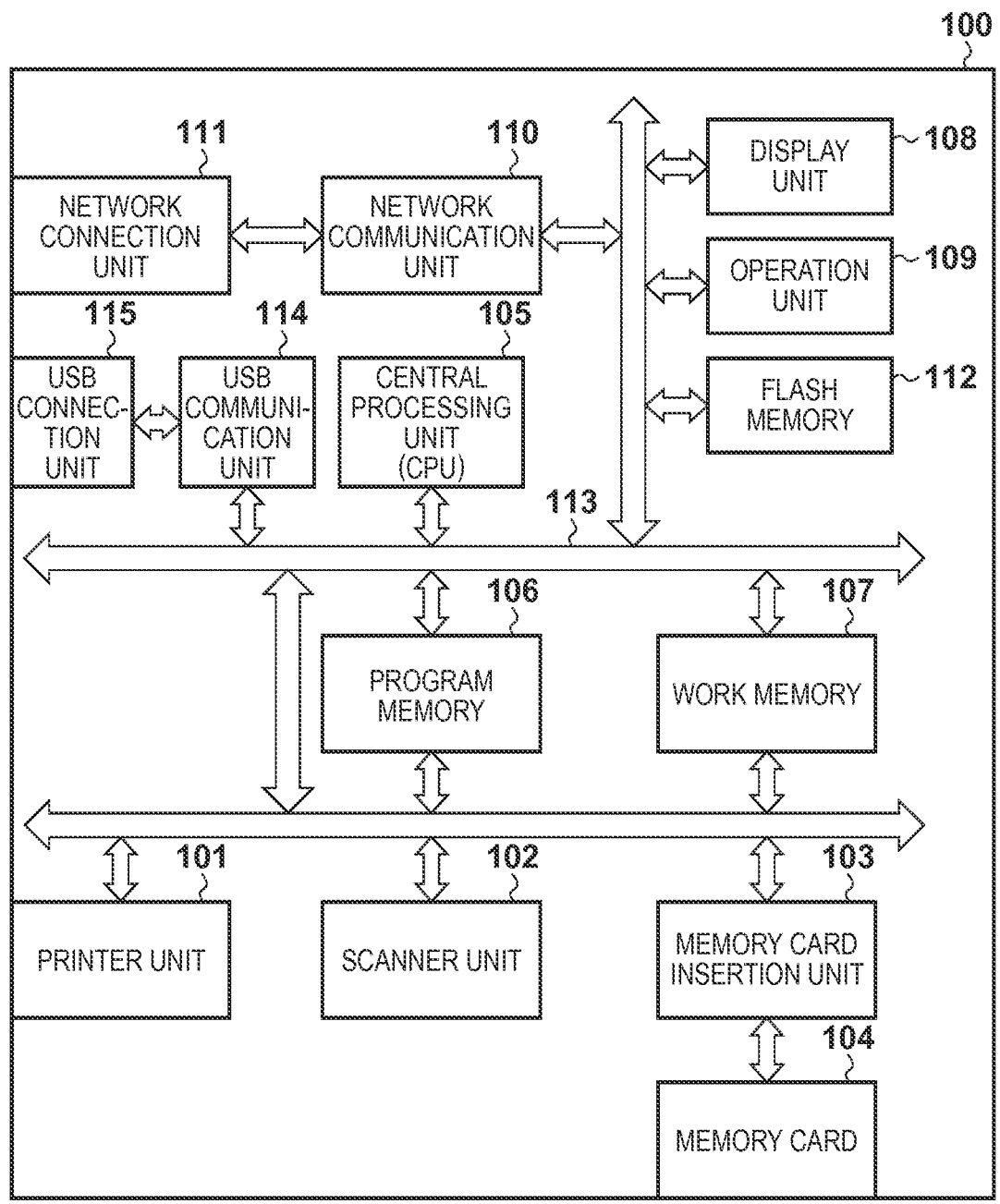

FIG. 5

| STORAGE DESTINATION | TYPE OF ORIGINAL DOCUMENT |
|---|---|
| PERSONAL COMPUTER | TEXT<br>PHOTOGRAPH<br>FILM |
| ATTACH TO MAIL | TEXT<br>PHOTOGRAPH<br>FILM |
| MEMORY CARD | TEXT<br>PHOTOGRAPH |

FIG. 6

| TYPE OF ORIGINAL DOCUMENT | READ-SETTING |
|---|---|
| TEXT | READING SIZE<br>FORM OF STORAGE<br>RESOLUTION<br>ADF ORIGINAL DOCUMENT ORIENTATION<br>ADF DOUBLE-FACE READING<br>BLEED-THROUGH REDUCTION<br>MOIRE REDUCTION<br>OUTLINE EMPHASIS |
| PHOTOGRAPH | READING SIZE<br>FORM OF STORAGE<br>RESOLUTION<br>OUTLINE EMPHASIS |
| FILM | FORM OF STORAGE<br>RESOLUTION<br>OUTLINE EMPHASIS |

FIG. 11

| DISPLAY | WSD EVENT | INQUIRY IN RESPONSE TO WSD EVENT |
|---|---|---|
| PERSONAL COMPUTER | SCAN | RETURN INQUIRY |
| ATTACH TO MAIL | SCAN FOR ELECTRONIC MAIL | RETURN INQUIRY |
| — | SCAN FOR OCR | DO NOT RETURN INQUIRY |
| — | SCAN FOR FAX | DO NOT RETURN INQUIRY |
| — | SCAN FOR PRINTING | DO NOT RETURN INQUIRY |

INFORMATION PROCESSING APPARATUS, CONTROL METHOD THEREOF, AND STORAGE MEDIUM STORING PROGRAM

BACKGROUND OF THE INVENTION

1. Field of the Invention

The present invention relates to an information processing apparatus for acquiring data read by a reading apparatus, a control method of the information processing apparatus, and a storage medium storing a program.

2. Description of the Related Art

Conventionally there has been a scanning function capable of transmitting read data of an original document, read by a reading apparatus, such as a MFP (Multi-Functional Peripheral) on a network, to an information processing apparatus, such as a PC. Such a scanning function includes pull scanning and push scanning functions. In the pull scanning function, original-document reading of a reading apparatus is executed by operation on an information processing apparatus, and read data is transmitted from the reading apparatus to the information processing apparatus. In the push scanning function, read data is transmitted to an information processing apparatus, which is designated as a transmission destination by operation on a reading apparatus. The push scanning function also includes a pseudo push scanning function, in which a read-start instruction from a reading apparatus is detected by an information processing apparatus, and the information processing apparatus instructs the reading apparatus to execute scanning based on a notification from the reading apparatus.

In a system including a plurality of information processing apparatuses and a plurality of reading apparatuses, several methods are known for recognizing a notification transmitted from a specific reading apparatus to a specific information processing apparatus. One of the methods is to recognize a notification from a reading apparatus by polling reading apparatuses from an information processing apparatus (Japanese Patent Laid-Open No. 2007-219956). Push scanning that utilizes such a method is known as polling push scanning. However, in this method, because packets are transmitted periodically and repeatedly for polling, communication on the network becomes overloaded.

On the other hand, there is a method of notifying an event occurrence in the reading apparatus to all or a specific information processing apparatus (Japanese Patent Laid-Open No. 2008-034923). Compared to the aforementioned method using polling, this method does not generate unnecessary packets on the network. Push scanning using such a method is known as event push scanning.

However, in the event push scanning, information that can be identified by a reading apparatus and an information processing apparatus is limited depending on the communication protocols adopted by these apparatuses. For instance, there is push scanning (WSD push scanning) utilizing the WSD (Web Services on Devices) scanning function of Windows Vista (registered trademark) or Windows 7 (registered trademark). In WSD push scanning, there is no method for notifying read-setting for scanning, such as a reading size, a form of storage, resolution, and so forth, from a reading apparatus to an information processing apparatus. Therefore, the read-setting for push scanning, set by a user on a reading apparatus, is not reflected in reading execution.

SUMMARY OF THE INVENTION

An aspect of the present invention is to eliminate the above-mentioned problems with the conventional technology. The present invention provides, in a system supporting event push scanning, an information processing apparatus that can reflect read-setting, set in a reading apparatus, in reading execution using a scanner driver, a control method of the information processing apparatus, and a storage medium storing a program.

The present invention in its first aspect provides an information processing apparatus capable of communication with a reading apparatus through a network, comprising: a reception unit configured to receive, through a network, a notification indicating that a read-start instruction is inputted in the reading apparatus that supports event push scanning; an acquisition unit configured to acquire read-setting of read operation, corresponding to the read-start instruction, from the reading apparatus through the network, in response to reception of the notification from the reception unit; and an instruction unit configured to instruct the reading apparatus, through the network, to read an image in accordance with the read-setting acquired by the acquisition unit and transmit read image data generated by the reading, using a predetermined scanner driver.

The present invention in its second aspect provides a control method of an information processing apparatus, which is implemented in an information processing apparatus capable of communication with a reading apparatus through a network, comprising the steps of: receiving, through a network, a notification indicating that a read-start instruction is inputted in the reading apparatus that supports event push scanning; acquiring read-setting of read operation, corresponding to the read-start instruction, from the reading apparatus through the network, in response to reception of the notification; and instructing the reading apparatus, through the network, to read an image in accordance with the acquired read-setting and transmit read image data generated by the reading, using a predetermined scanner driver.

The present invention in its third aspect provides a storage medium storing a non-transitory computer-readable program which causes a computer to execute processing comprising the steps of: receiving, through a network, a notification indicating that a read-start instruction is inputted in a reading apparatus that supports event push scanning; acquiring read-setting of read operation, corresponding to the read-start instruction, from the reading apparatus through the network, in response to reception of the notification; and instructing the reading apparatus, through the network, to read an image in accordance with the acquired read-setting and transmit read image data generated by the reading, using a predetermined scanner driver.

According to the present invention, in a system supporting event push scanning, it is possible to reflect read-setting, set in a reading apparatus, in reading execution using a scanner driver.

Further features of the present invention will become apparent from the following description of exemplary embodiments with reference to the attached drawings.

BRIEF DESCRIPTION OF THE DRAWINGS

FIG. 1 is a block diagram showing a brief configuration of a MFP;

FIG. 5 is a view showing corresponding relations between storage destinations that can be selected by a user and types of original documents;

FIG. 6 is a view showing a list of read-setting corresponding to respective types of original documents shown in FIG. 5;

FIG. 11 is a table showing an exemplified case where an inquiry is returned and a case where an inquiry is not returned;

DESCRIPTION OF THE EMBODIMENTS

Figure 2:
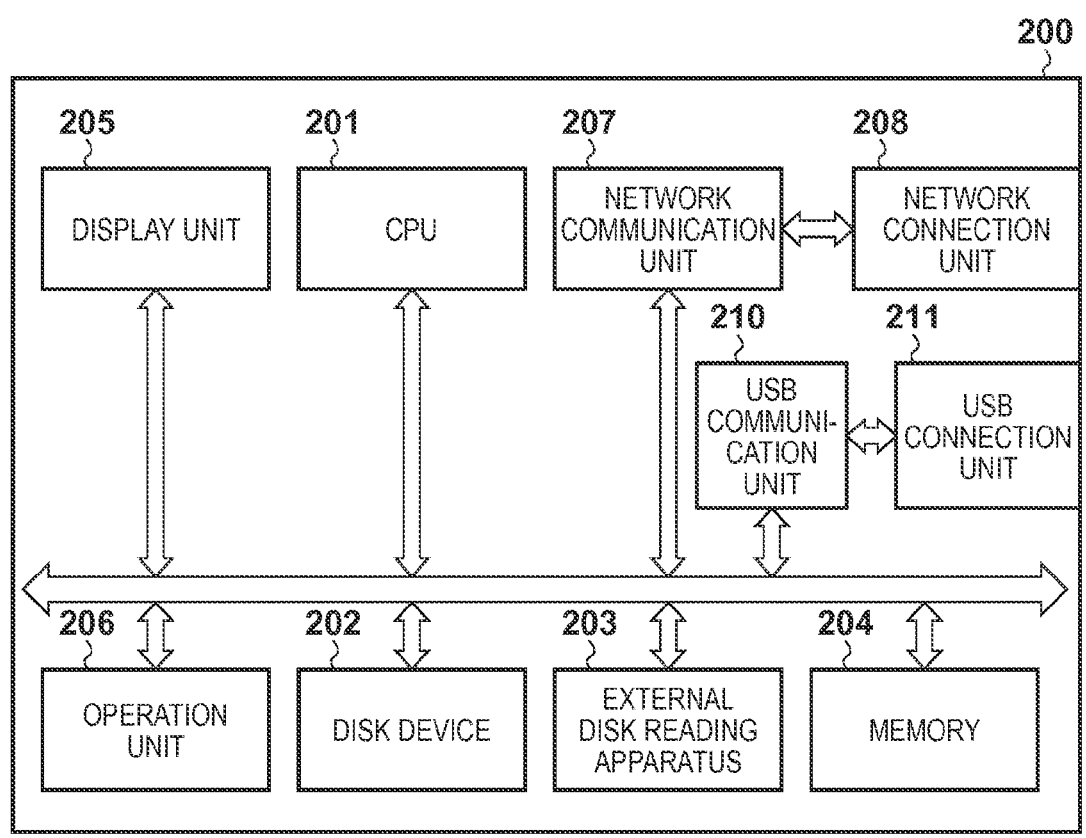
FIG. 2 is a block diagram showing a brief configuration of an information processing apparatus.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that, components having the same function are referred to by the same reference numerals, and descriptions thereof are omitted.

First Embodiment

Hereinafter, a method of push scanning using the WSD (Web Service on Devices) protocol, which is one of communication protocols on a network, is described.

FIG. 1 is a block diagram showing a configuration of a MFP (Multifunctional Peripheral) according to the embodiment of the present invention. The MFP 100, having functions for printing, scanning, and storage, is capable of providing services to an information processing apparatus through a network using the respective functions. The MFP 100 realizes printer function by a printer unit 101, and realizes scanning function by a scanner unit 102. The MFP 100 also realizes storage function by a memory card insertion unit 103 and a memory card 104. The printer unit 101 prints an image on a printing medium, such as printing paper, based on printing data received from an external unit or image data or the like stored in the memory card 104 using an inkjet method, an electrophotographic printing method, or the like. The scanner unit 102 optically reads an original document placed on a platen or an original document conveyed by an ADF (Auto Document Feeder), and converts the read original document image to electronic data (image data). Also, the scanner unit 102 can convert image data to a designated file format and transmit it to an external unit through a network. By transferring image data, generated by reading an original document by the scanner unit 102, to the printer unit 101 and printing an image by the printer unit 101 on printing paper based on the image data, the copying function is realized. Besides the aforementioned functions, it is possible for an external apparatus to read and edit data, stored in the memory card 104, and store the edited data again in the memory card 104.

The MFP 100 comprises a central processing unit (CPU) 105 for controlling respective units of the MFP 100, and program memory 106 for storing program codes or the like read by the CPU 105. For the program memory 106, for instance, ROM is used. The MFP 100 also comprises work memory 107, such as RAM, for buffering or temporarily storing image data or the like at the time of executing each of the above-described functions, a display unit 108 such as a liquid crystal display, and an operation unit 109 comprising a plurality of input keys. Further, the MFP 100 comprises a network communication unit 110 for enabling various communications by connecting the MFP 100 to a network, and a network connection unit 111 for connecting the network communication unit 110 to a network medium, such as a cable. The network communication unit 110 is configured so as to be compatible with a wired LAN or wireless LAN. The case where the network communication unit 110 is compatible with a wired LAN is, for instance, when the network connection unit 111 is a connector for connecting the MFP 100 to a wired LAN cable. The case where the network communication unit 110 is compatible with a wireless LAN is, for instance, when the network connection unit 111 is an antenna. Furthermore, the MFP 100 comprises memory 112, such as non-volatile flash memory, which can store information regarding a transmitter of a packet received by the network communication unit 110. The above-described units of the MFP 100 are connected in a way that each unit can communicate mutually through a signal line 113, such as a bus. A USB communication unit 114 can perform communication with an external apparatus through a USB (Universal Serial Bus) connector or the like. A USB connection unit 115, such as a USB connector, connects the network medium, such as a cable, to the USB communication unit 114.

FIG. 2 is a block diagram showing a brief configuration of an information processing apparatus, such as a PC, according to the present embodiment. A CPU 201 controls respective units of the PC 200 and executes each of the above-described functions. A disk device (storage device) 202 stores various files, such as an application program, an OS (Operating System) read and executed by the CPU 201, and so on. For an OS, assume that Windows Vista (registered trademark), Windows 7 (registered trademark) or the like, which is capable of applying the WSD (Web Services on Devices) scanning function, is installed. When the OS is installed, a WSD-standard scanner driver is also installed. The WSD-standard scanner driver is compliant with the WIA (Windows Imaging Acquisition). In the PC 200, a driver (TWAIN driver) that is compliant with the TWAIN (Tool Without An Interesting Name) may also be installed as a scanner driver, in addition to the WSD-standard scanner driver. An external disk reading apparatus 203 reads contents stored in an external storage medium, such as CD-ROM. Memory 204 is used for temporary data storage or data buffering as needed by the CPU 201. For a display unit 205, for instance, a liquid crystal display is used. For an operation unit 206, for instance, a keyboard and a pointing device are used. A network communication unit 207 enables communication between the PC 200 and an information processing apparatus on a network. A network connection unit 208 connects the network communication unit 207 to a network medium, such as a cable. Similar to the network communication unit 110 and the network connection unit 111 of the MFP 100, the network communication unit 207 and the network connection unit 208 are configured so as to be compatible with a wired LAN or wireless LAN. A signal line 209, such as a bus, connects each of the above-described units for enabling mutual communication. A USB communication unit 210 enables communication through a USB connection unit 211 between the PC 200 and various other peripherals. For the USB connection unit 211, for instance, a USB connector is used.

Figure 3:
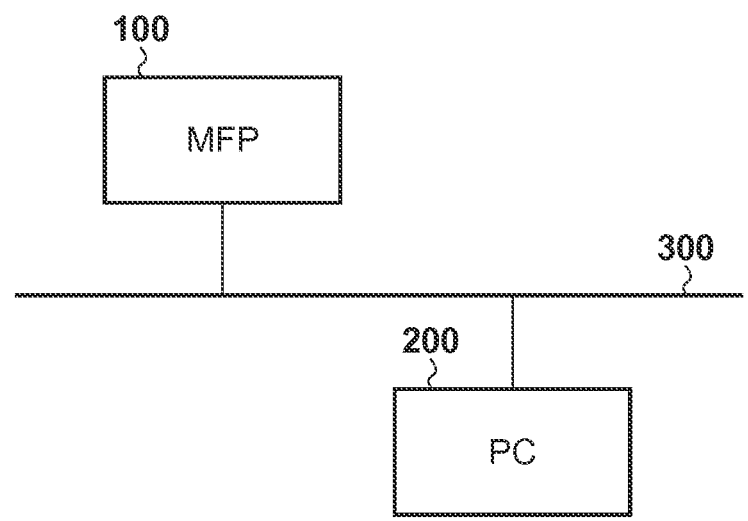
FIG. 3 is a block diagram showing a brief configuration of a system including a MFP and a PC.

FIG. 3 is a diagram showing a brief configuration of a system including the MFP 100 shown in FIG. 1 and the PC shown in FIG. 2. The MFP 100 serving as a reading apparatus and the PC 200 serving as an information processing apparatus are connected through a network 300, such as a LAN, so as to be able to communicate mutually. In the present embodiment, the network 300 may be either a wired LAN or wireless LAN. Further, an image scanner or the like, which does not have a printing function, may be used in place of the MFP 100. Furthermore, a plurality of PCs 200 or a plurality of MFPs 100 may be connected to the network 300.

Figure 4:
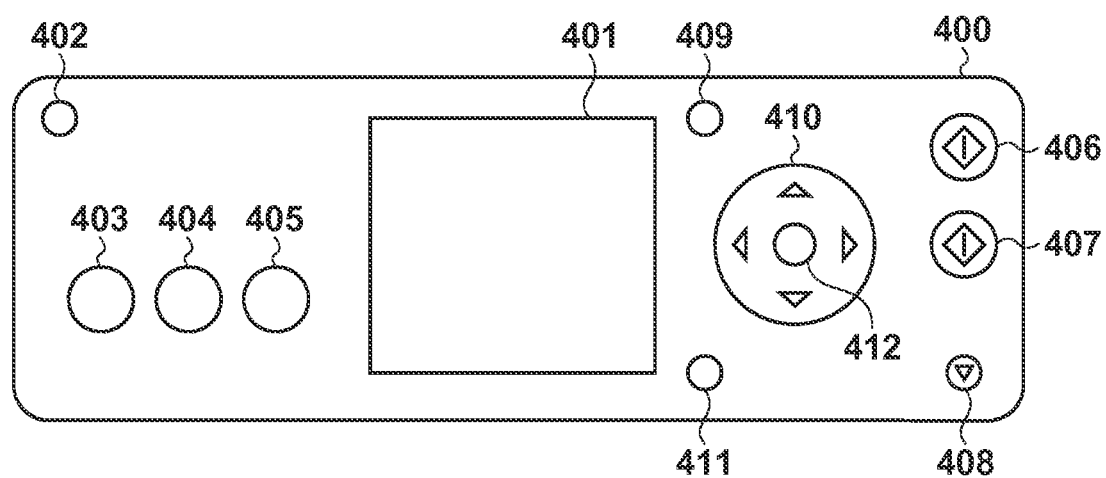
FIG. 4 is an exemplary view showing a layout on a console panel of a MFP 100.

FIG. 4 is an exemplary view showing a layout on a console panel 400 of the MFP 100, which includes the display unit 108 and the operation unit 109. A screen 401, which is a liquid crystal display or the like, corresponds to the display unit 108. Keys 402 to 412, which correspond to the operation unit 109, are used for receiving various instructions from a user. A key 402 is a power key for receiving ON/OFF selection instruction from a user for each unit of the MFP 100. A key 403 is a copy key for receiving a start instruction from a user in order to execute copying function of the MFP 100. A key 404 is a scan key for receiving a start instruction from a user in order to execute push scanning function of the MFP 100.

The push scanning function is hereinafter described. The push scanning function is to transfer scanned data (may also be referred to as a scanned image, read data, image data or the like), which is obtained by optically reading an original document placed on the platen of the MFP 100 or an original document conveyed by the ADF, to a designated PC by user operation on the MFP 100, which serves as a trigger. The user operation is, for instance, depression of a scan key by a user. Also, the user can make a decision with respect to an information processing apparatus, where the scanned data is to be stored, and read-setting such as the type of original document, while referring to the screen 401 and operating the keys 410 and 412.

A memory card key 405 is used, in a case where a memory card 104 is inserted in the MFP 100, for receiving a start instruction from a user in order to execute printing (memory card printing) or displaying based on predetermined image data or the like stored in the memory card 104. A key 406 is a color start key for receiving a start instruction from a user for color execution of the copying function, push scanning function, memory card printing function, and so on. A key 407 is a monochrome start key for receiving a start instruction from a user for monochrome execution of the copying function, push scanning function, memory card printing function, and so on. A key 408 is a stop key for receiving a stop instruction from a user in order to stop execution of the copying function, push scanning function, memory card printing function, and so on. Keys 410 are arrow keys for receiving a search instruction from a user in order to search a desired setting menu or data in the memory card 104 to be printed or displayed. A key 411 is used by a user for turning the menu screen to a previous screen. A key 412 is used for selecting or deciding an item selected by a cursor on the screen 401.

FIG. 5 shows a list of corresponding relations between storage destinations, which can be selected by a user in execution of push scanning function, and types of original documents corresponding to the storage destinations. For instance, when the scan key 404 is depressed, the MFP 100 displays items such as "personal computer," "attach to mail," "memory card," and "USB memory," and lets the user select a storage destination of scanned data. When the user selects a storage destination and the type of original document to be scanned, the MFP 100 displays read-setting items corresponding to the type of original document.

The embodiment may be so configured that, when the user selects "personal computer" or "attach to mail," the user can further select, as a storage destination, either a USB-connected PC or one of a plurality of PCs connected on the network. In this case, the type of connection, names of personal computers or user names logged in to the personal computers or the like may be displayed on the screen 401 so that the user can select one. When the user selects "memory card," scanned data is stored directly in the memory card 104 which is inserted in the memory card insertion unit 103 of the MFP 100; therefore, communication with the PC 200 is not necessary. In this case, push scanning is performed only by internal processing of the MFP 100. If data can be stored directly in a storage medium other than a memory card, a writable storage medium, such as USB memory inserted in the USB connection unit 115, CD-ROM, DVD, BLD, HDD or the like, can be selected.

FIG. 6 shows a list of read-setting corresponding to respective types of original documents shown in FIG. 5. A user can select desired read-setting while confirming the display on the screen 401. For instance, with respect to the reading size, a user can make a selection from A4, L, 2L, postcard, KG, business card, letter, auto-crop, and so on. In the auto-crop size, the entire surface of the platen is scanned, and cropping is performed in accordance with the size of the scanned original document. Furthermore, with respect to the form of storage, a user can select a file format from JPEG, TIFF, PDF and so on. The embodiment may be so configured that a user can further set a compression rate of PDF or JPEG. With respect to resolution, a user can select one from 75 dpi, 150 dpi, 300 dpi, 600 dpi, 1200 dpi, 2400 dpi, 4800 dpi, and so on. The embodiment may be so configured that only the values appropriate for the type of original document are displayed for user selection.

With respect to an ADF original document orientation, a user can make a selection by setting the document in either a landscape direction or portrait direction in the ADF. In accordance with the setting, scanned image data can be rotated in an appropriate direction and outputted. Further, with respect to double-face reading of the ADF, a user can select whether or not to activate the double-face reading function of the original document in the ADF. Further, with respect to bleed-through reduction, a user can select whether or not to perform image processing for reducing bleed-through of the back surface of a double-face original document. Furthermore, with respect to reduction of moire, a user can select whether or not to perform image processing for reduction of moire that is generated in scanning a magazine or the like. Furthermore, with respect to outline emphasis, a user can select whether or not to perform image processing for emphasizing image outlines.

Figure 7:
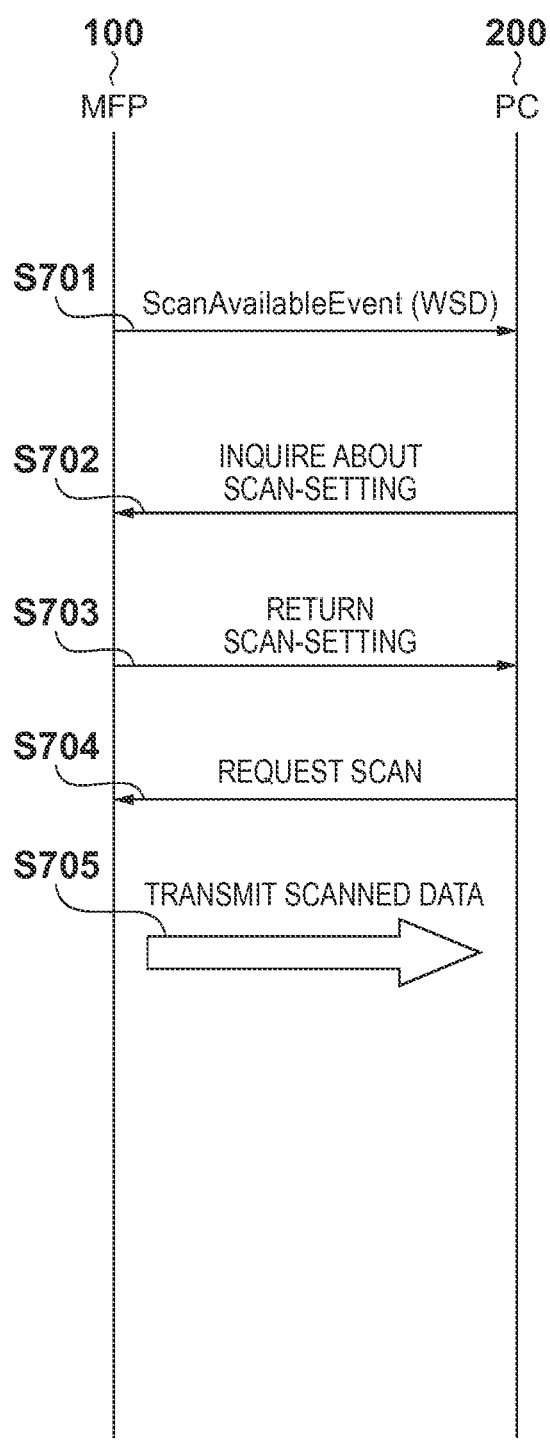
FIG. 7 is a view showing a procedure of push scanning according to the first embodiment.

FIG. 7 is a flowchart showing a procedure of push scanning (WSD event push scanning) performed between the MFP 100 and the PC 200 according to the present embodiment. In the flowchart in FIG. 7, each processing performed by the MFP 100 is executed by, for instance, the CPU 105, and each processing performed by the PC 200 is executed by, for instance, the CPU 201. In the PC 200, an OS compliant with a WSD protocol, such as Windows Vista, Windows 7, or the like is installed. When the OS is installed, the MFP 100 is selected as a WSD device connected to the network so that the PC 200 can utilize the scanning function of the MFP 100 using the WSD protocol. In the PC 200, the WSD-standard scanner driver in the OS is also installed. There are five push events that are defined by the WSD-standard scanner driver. An OS-standard event is allocated to these push events. According to the present embodiment, the MFP 100 does not have to support all five push events defined by the WSD-standard scanner driver in the PC 200.

Figure 8:
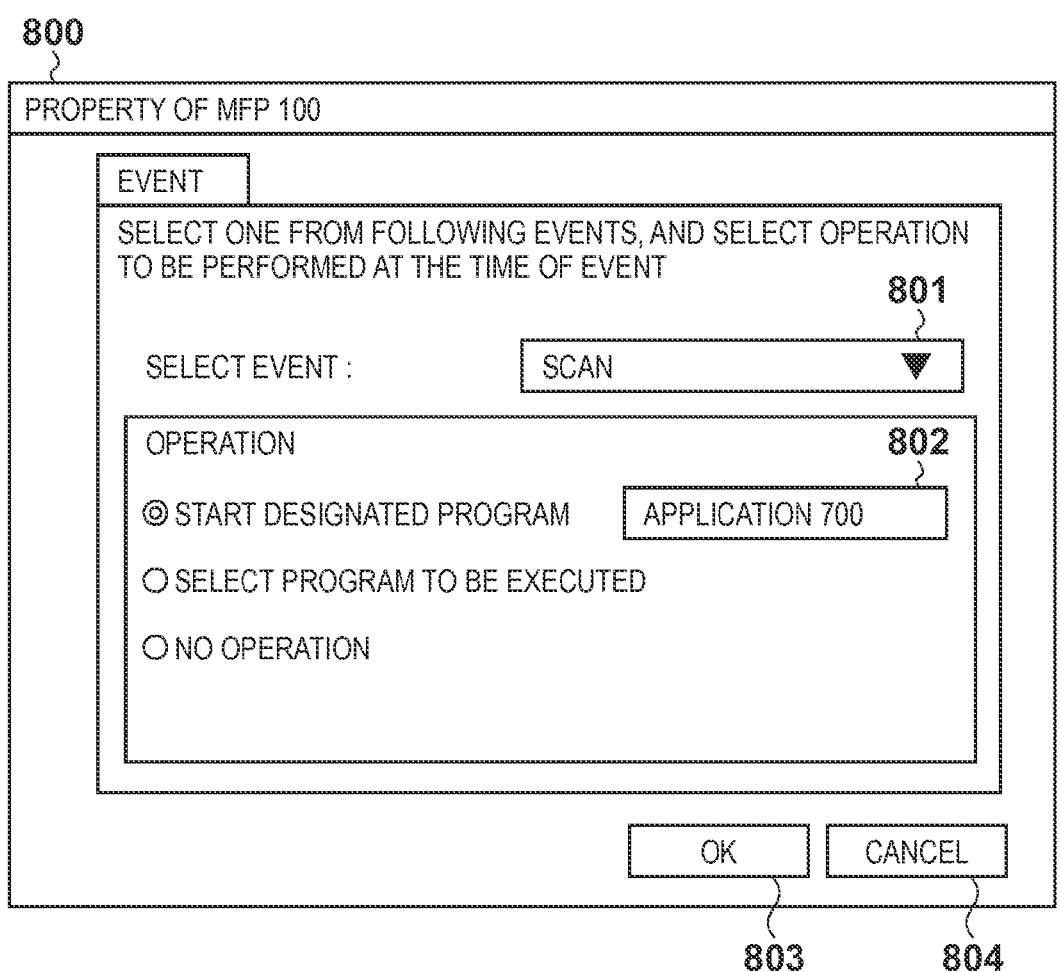
FIG. 8 is an exemplary view showing a property setting screen of a push event.

FIG. 8 is an exemplary view showing a property setting screen regarding a push event from the MFP 100, which is displayed in the display unit 205 of the PC 200. A user can change the push-event setting state of the MFP 100 using a property dialog 800. The property dialog 800 shown in FIG. 8 is prepared by the OS. A push event from the MFP 100 can be selected by a user from a pull-down list 801. The user can select an operation item for each push event. For instance, if the user selects the operation item "start the designated program," then the user can select an application program to be started from a pull-down list 802. When a user selects an operation item for each push event and depresses an OK button 803, the selected contents are entered and stored. When a cancel button 804 is depressed, the selected contents are discarded.

In the present embodiment, an application program 700 is pre-installed in the disk device 202 of the PC 200. The application 700 can receive a WSD event from the MFP 100. When a WSD event is received from the MFP 100, the application 700 is allocated to the event. Allocation of the application 700 to an event from the MFP 100 may be realized by changing the setting described in the registry of the PC 200 by an application installer. For changing the setting, an API prepared in the OS may be used, or the change may be made by manually opening the property dialog 800.

Furthermore, in the present embodiment, the WSD scanner driver and the application 700 for the MFP 100 are pre-installed in the disk device 202 of the PC 200. Also, the application 700 is allocated in advance to a WSD event from the MFP 100 as described above. For a condition of processing shown in FIG. 7, the MFP 100 and the PC 200 must be turned on and operable.

First, a user depresses the scan key 404 on the MFP 100, designates the PC 200 as a scanned-image storage destination, and depresses the color start key 406 or monochrome start key 407. If there are a plurality of transmission destination PCs that support WSD scanning, PC selection is performed (herein, assume that the PC 200 is selected). In this case, PCs that serve as the transmission destination candidates can be specified by performing a search in accordance with the WSD protocol. Thereafter, the MFP 100 issues a "Scan Available Event" command compliant with the WSD API, and transmits (notifies) the command to the PC 200 through the network 300 (S701). The command, which is an OS-standard API, includes a connection device path of the ImageClass and an event GUID. For the ImageClass connection device path, for instance, "StiDevice:{6BDD1FC6-810E-11D0-BEC7-08002BE2092F}¥0001" is described in the command. Based on the information, the application 700 of the PC 200 specifies the MFP 100 and the type of event issued. Because the MFP 100 is registered as a WSD device in the PC 200, the event from the MFP 100 is acquired as an event to be processed by the PC 200.

The application 700 makes an inquiry through the network 300 about read-setting, which has been designated by the user from the console panel 400, to the MFP 100 specified in S703 in response to the event reception from the MFP 100 (S702). The MFP 100 acquires the read-setting, which has been set by the user on the console panel 400, in response to the inquiry from the PC 200, and returns a response to the PC 200 through the network 300 (S703). For instance, the content based on the read-setting shown in FIG. 6 is returned to the PC 200. Furthermore, regardless of whether the user depresses the color start key or monochrome start key, there is a case that the WSD-standard driver provides only one type of event GUID. In this case, in S703, the MFP 100 returns a response to the PC 200 regarding information about either color setting or monochrome setting.

The application 700 transmits a scan request using the WSD-standard scanner driver to the MFP 100 through the network 300 in accordance with the read-setting acquired from the MFP 100 in S703, thereby instructing scan execution to the MFP 100 (S704). In response to the scan execution instruction, the MFP 100 starts scanning by the scanner unit 102 for reading an image on the original document, and transmits scanned data to the PC 200 through the network 300 (S705).

Figure 18:
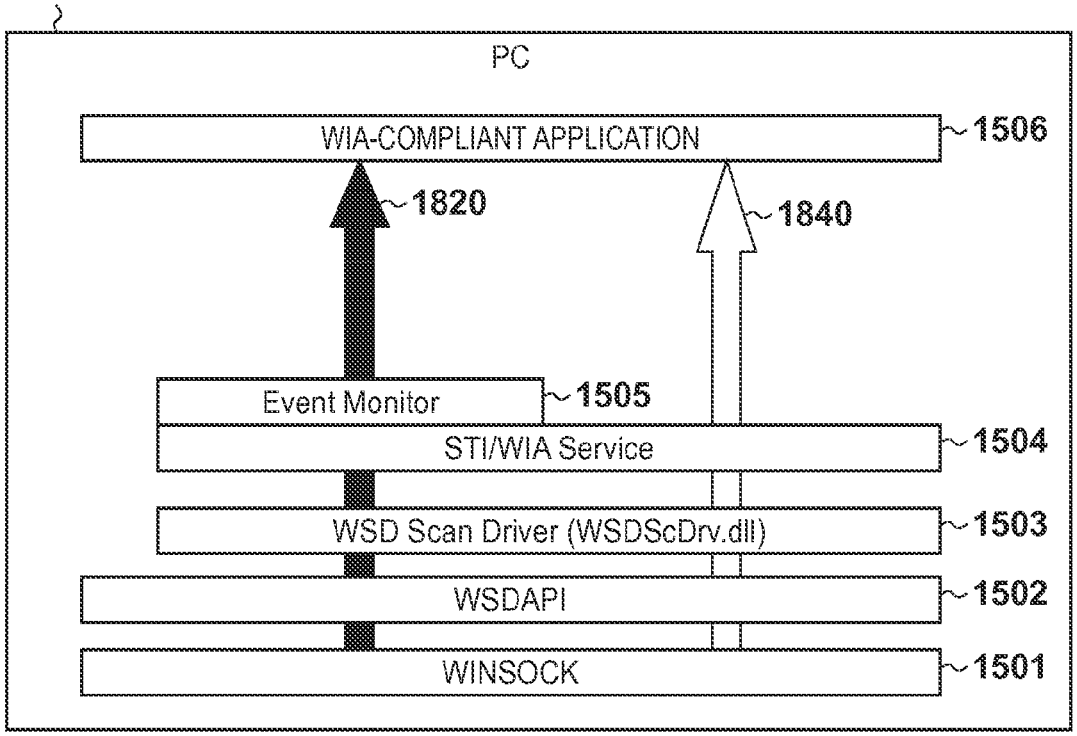
FIG. 18 is a brief view showing a conventional software module configuration.

FIG. 18 is a brief view showing a general module configuration of software in the PC 200 used in WSD scanning. When scan execution is instructed to the MFP 100, a WIA-compliant application 1506 in the PC 200 starts up an OS-standard WSD Scan Driver (WSDScDrv.dll) 1503 through STI/WIA Service 1504 of the OS. The WSD Scan Driver 1503 instructs scan execution to the MFP 100 through WINSOCK (Windows Sockets API) 1501 using WSD API 1502. After instructing scan execution, the PC 200 acquires scanned data 1840 from the MFP 100. When a push event 1820 is received from the MFP 100, Event Monitor 1505 serving as an OS starts up the WIA-compliant application 1506 that is allocated to the push event 1820. With the use of read-setting that has been set in advance in the WIA-compliant application 1506, a scan instruction is given by the WSD Scan Driver 1503 to the MFP 100.

Figure 15:
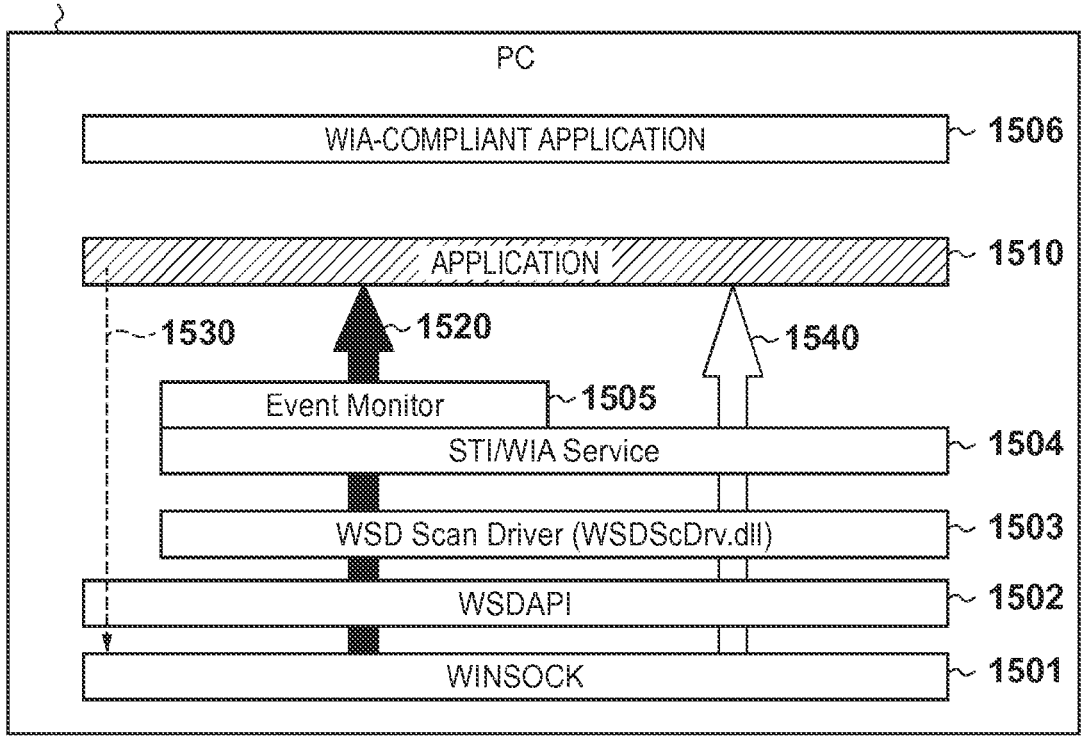
FIG. 15 is a brief view showing a software module configuration according to the first to third embodiments.

FIG. 15 is a brief view showing a module configuration of software in the PC 200 used in WSD scanning using the WSD-standard scanner driver according to the present embodiment. An application 1510 corresponds to the application 700 described in FIG. 8. Because the application 1510 is allocated to a push event 1520, when the PC 200 receives a push event 1520 from the MFP 100, the application 1510 transmits an inquiry 1530 about read-setting (contents of read-setting set on the console panel 400 in the MFP 100) to the MFP 100. This corresponds to the processing in S702 in FIG. 7. The application 1510 transmits the read-setting inquiry 1530 to the MFP 100 through the WINSOCK 1501 using the WSD API 1502. Then, the application 1510 notifies the WSD Scan Driver 1503 of the read-setting received from the MFP 100 in S703. In accordance with the read-setting, a scan instruction is given from the WSD Scan Driver 1503 to the MFP 100 (S704). After the MFP 100 executes scanning, the PC 200 acquires scanned data 1540 from the MFP 100 (S705). The point that the Event Monitor 1505 is used for detection of a push event 1520 is identical to FIG. 18. Also, the flow of acquiring the scanned data 1540 by starting up the OS-standard WSD Scan Driver 1503 through the STI/WIA Service 1504 is identical to the scanned data 1840 in FIG. 18.

Figure 16:
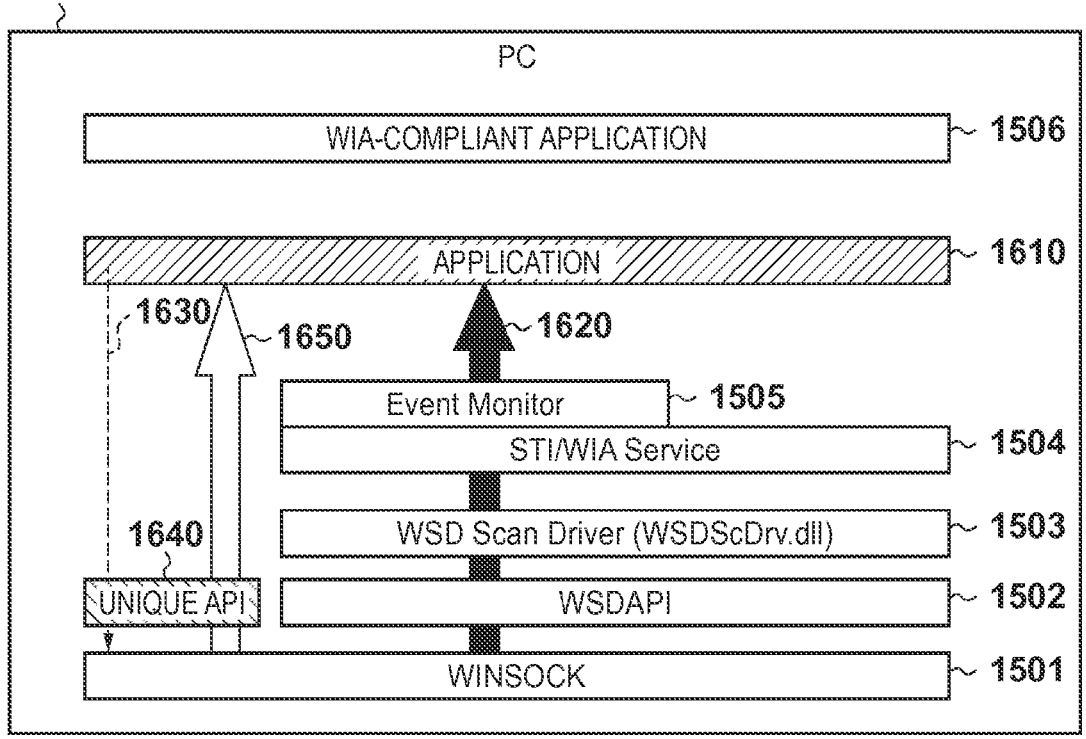
FIG. 16 is another brief view showing a software module configuration according to the first to third embodiments.

FIG. 16 is another brief view showing a module configuration of software in the PC 200 used in WSD scanning according to the present embodiment. An application 1610 corresponds to the application 700 described in FIG. 8. Because the application 1610 is allocated to a push event 1620, when the PC 200 receives a push event 1620 from the MFP 100, the application 1610 transmits an inquiry 1630 about read-setting to the MFP 100. This corresponds to the processing in S702 in FIG. 7. The application 1610 transmits the read-setting inquiry 1630 to the MFP 100 through the WINSOCK 1501 using a unique API 1640. After the MFP 100 executes scanning, the PC 200 acquires scanned data 1650 from the MFP 100. Unlike FIGS. 15 and 18, in this example, the unique API 1640 receives the scanned data 1650 from the WINSOCK 1501, and transfers the scanned data 1650 directly to the application 1610. In the case of using a unique API as in this example, the unique API 1640 is also installed when the application 1610 is installed. By virtue of the configuration of this example, the PC 200 can transmit or receive necessary data to or from the MFP 100 regardless of the form of WSD API 1502.

Second Embodiment

Figure 9:
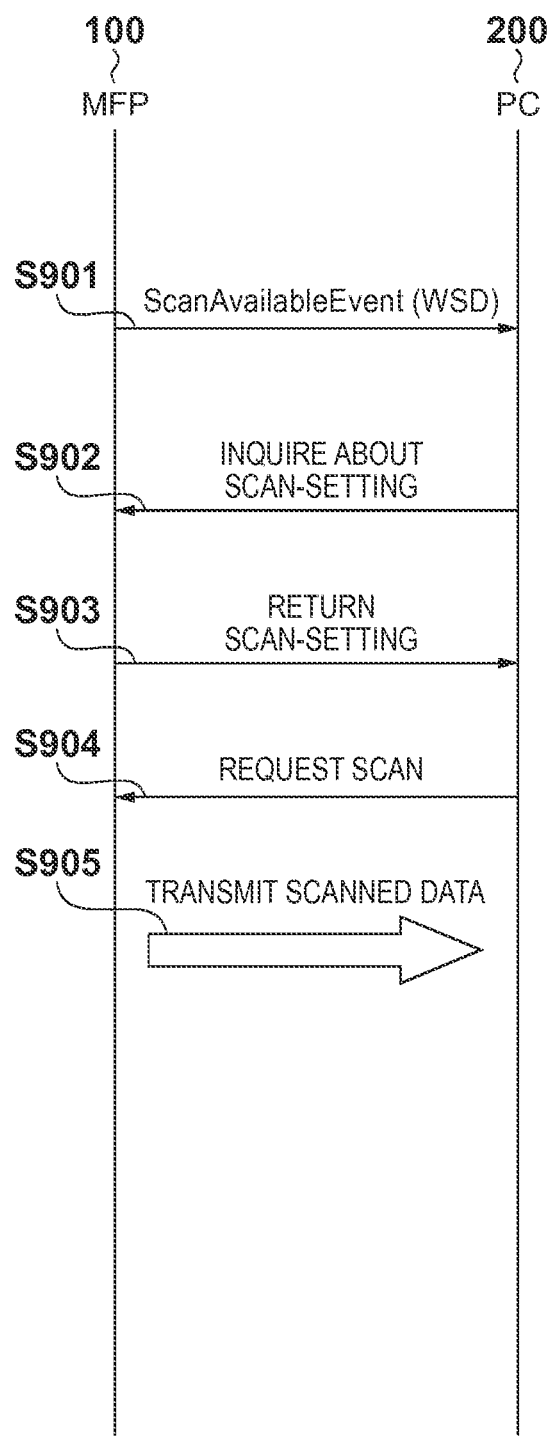
FIG. 9 is a view showing a procedure of push scanning according to the second embodiment.
Figure 10:
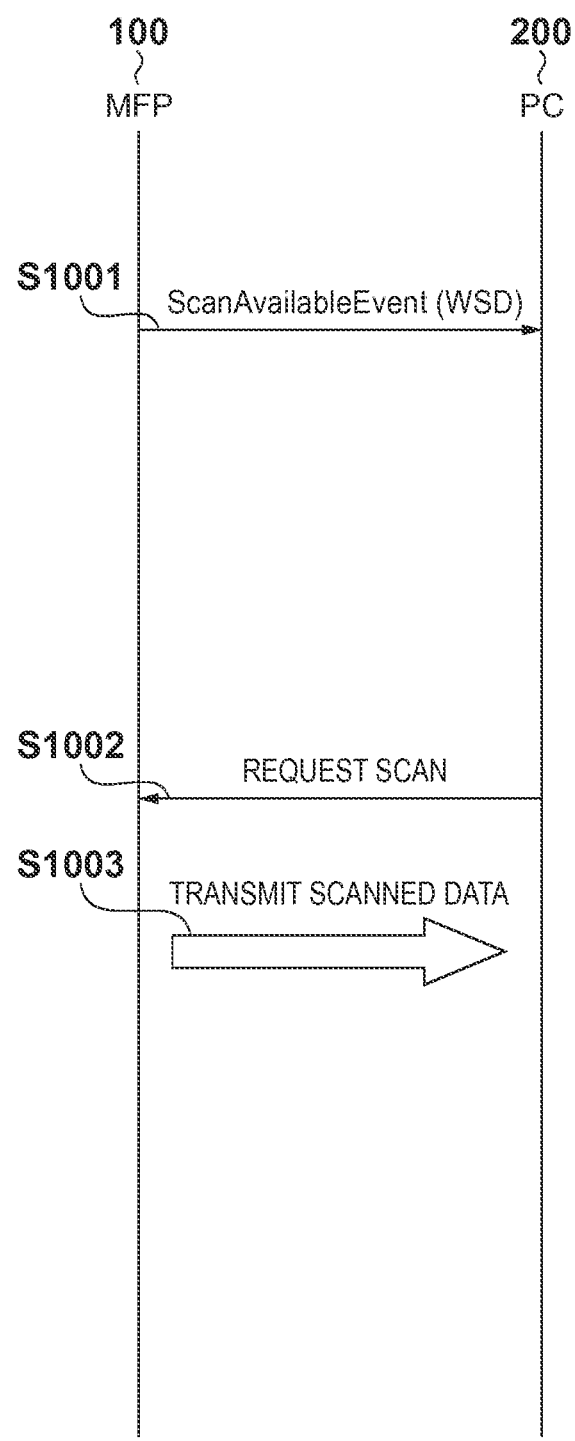
FIG. 10 is a view showing a procedure in a case where an inquiry is not transmitted.

The present embodiment differs from the first embodiment in that the PC 200 determines whether or not to make an inquiry about read-setting in accordance with the type of push event from the MFP 100. FIG. 9 is a flowchart showing a procedure of push scanning performed between the MFP 100 and the PC 200 according to the second embodiment. FIG. 10 is a flowchart showing a case where the PC 200 does not make an inquiry in response to a push event. FIG. 11 is a table showing an exemplified case where the application 700 of the PC 200 returns an inquiry and a case where the application 700 does not return an inquiry. The table is stored in the disk device 202, and the PC 200 makes determination as to whether or not to return an inquiry in accordance with the contents of the table. The application 700 is registered in the PC 200 through the setting screen shown in FIG. 8 as an application to be started at the time of WSD-event reception from the MFP 100. The application 700 according to the present embodiment corresponds to the application 1510 in FIG. 15 or the application 1610 in FIG. 16. Herein, assume that there are two setting items "personal computer" and "attach to mail" when the PC 200 is set as a storage destination on the console panel 400 of the MFP 100. Also, assume that there are five events supported by the WSD standard driver: "scan," "scan for electronic mail," "scan for OCR," "scan for FAX," and "scan for printing."

As shown in FIG. 11, for the aforementioned WSD event "scan," the setting "personal computer" in the MFP 100 is allocated. Moreover, for the WSD event "scan for electronic mail," the setting "attach to mail" in the MFP 100 is allocated. For these two events, it is necessary to make an inquiry about read-setting. Therefore, the PC 200 returns an inquiry to the MFP 100 in accordance with an issued WSD event. Meanwhile, for other three WSD events supported by the WSD standard driver "scan for OCR," "scan for FAX," and "scan for printing," there is no corresponding setting in the MFP 100. Therefore, if these events are issued by the MFP 100 to the PC 200, the PC 200 does not return an inquiry about read-setting.

A user depresses the scan key 404 on the MFP 100, selects the setting "personal computer" or "attach to mail" on the screen 401, and designates the PC 200 as a scanned-image storage destination. When the user depresses the color start key 406 or the monochrome start key 407, the MFP 100 issues a "Scan Available Event" command compliant with the WSD API 1502, and transmits the command to the PC 200 through the network 300 (S901). The command, which is an OS-standard API, includes a connection device path of the Image-Class and an event GUID. Based on the information, the application 700 of the PC 200 specifies the MFP 100 and the type of event issued. In this embodiment, the PC 200 refers to the information on the table shown in FIG. 11, determines that the type of event is a push event that requires an inquiry about read-setting, and transmits an inquiry, through the network 300, about read-setting to the MFP 100 that has been specified (S902).

In response to the inquiry from the PC 200, the MFP 100 transmits the read-setting, which has been set by the user on the console panel 400, to the PC 200 through the network 300 (S903). The application 700 transmits a scan request according to the read-setting to the MFP 100 through the network 300, thereby instructing scan execution (S904). In response to the scan request, the MFP 100 executes scanning and transmits scanned data to the PC 200 through the network 300 (S905).

Described next with reference to FIG. 10 is a case where the PC 200 does not make an inquiry about read-setting to the MFP 100. When a user sets "scan for OCR" "scan for FAX" or "scan for printing" on the screen 401 of the MFP 100 and instructs to execute one of the functions, the MFP 100 issues a corresponding event command and transmits the event to the PC 200 through the network 300 (S1001). The application 700 analyzes the connection device path of the ImageClass and the event GUID, refers to the table shown in FIG. 11, and determines that there is no need to return an inquiry. In accordance with the determination result, the PC 200 does not make an inquiry about read-setting to the MFP 100, but transmits a scan request to the MFP 100 through the network 300 based on the read-setting stored in the application 700, thereby instructing scan execution (S1002). Herein, the application 700 transmits the default read-setting to the MFP 100 through the network 300. The MFP 100 executes scanning in response to the scan request, and transmits the scanned data to the PC 200 through the network 300 (S1003).

In the present embodiment, in a case where an event that cannot perform setting on the console panel 400 of the MFP 100 is issued, a user interface of the WIA driver compliant with the standard WSD may be displayed on the display unit 205 without performing the processing after S1002. By this processing, the user interface allows the user to set read-setting, and enables the MFP 100 to perform reading based on the desired read-setting. In this stage, the console panel 400 of the MFP 100 may display a message to allow the user to operate the PC 200 for performing the read-setting or giving a read-start instruction.

Third Embodiment

Figure 12:
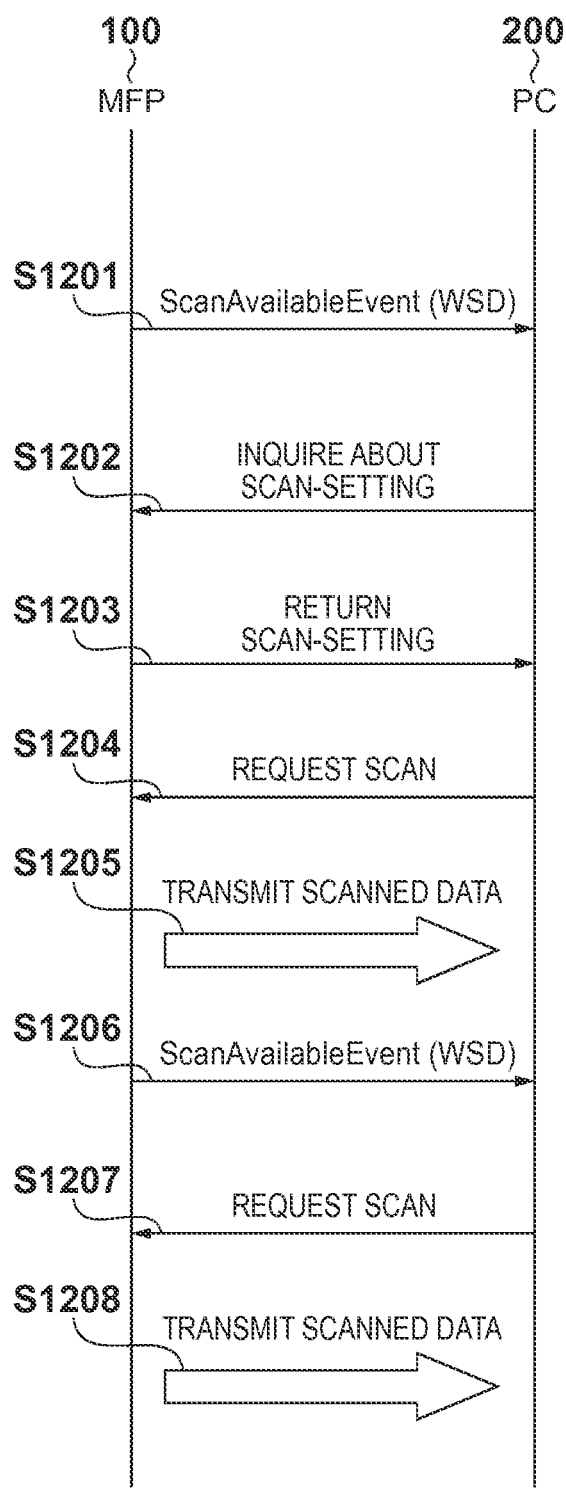
FIG. 12 is a view showing a procedure of push scanning according to the third embodiment.

The present embodiment describes a case where the PC 200 receives a new push event from the MFP 100 immediately after the PC 200 receives scanned data from the MFP 100. For instance, in a case where a user places an original document on the platen and gives a read-instruction while changing plural sheets of the original document, or in a case where a user places a stack of original documents in the ADF a plurality of numbers of times and repeatedly gives read-instructions, the processing according to the present embodiment is performed. The present embodiment differs from the first embodiment in that, in the above-described case, the PC 200 determines whether or not to make an inquiry about read-setting in accordance with a determination result of whether or not the same push event has been received. FIG. 12 is a flowchart showing a procedure of push scanning performed between the MFP 100 and the PC 200 according to the third embodiment.

A user depresses the scan key 404 on the MFP 100, selects the setting "attach to mail" as a storage destination on the screen 401, and designates the PC 200 as a scanned-image storage destination. When the user depresses the color start key 406, the MFP 100 issues a "Scan Available Event" command compliant with the WSD API of the PC 200, and transmits the command to the PC 200 through the network 300 (S1201). The command, which is an OS-standard API, includes a connection device path of the ImageClass and an event GUID. Based on the information, the application 700 of the PC 200 specifies the MFP 100 and the type of push event issued. In this embodiment, the PC 200 stores the specified MFP 100 and the type of push event in the memory 204 or the like. The application 700 is registered in the PC 200 through the setting screen shown in FIG. 8 as an application to be started at the time of WSD-event reception from the MFP 100. The application 700 of the PC 200 according to the present embodiment corresponds to the application 1510 in FIG. 15 or the application 1610 in FIG. 16.

The application 700 makes an inquiry, through the network 300, about read-setting with respect to the MFP 100 that has been specified (S1202). In response to the read-setting inquiry from the PC 200, the MFP 100 transmits the read-setting, which has been set by the user on the console panel 400, to the PC 200 through the network 300 (S1203). The application 700 transmits a scan request according to the read-setting to the MFP 100 through the network 300, thereby instructing scan execution (S1204). In this stage, the content of the read-setting is stored in the memory 204 or the like in the present embodiment. In response to the scan request, the MFP 100 executes scanning and transmits scanned data to the PC 200 through the network 300 (S1205). In S1202, the application 700 makes an inquiry by confirming that the memory 204 does not have a device (MFP 100) having the same connection device path and read-setting corresponding to the event GUID.

In S1205, after scanning in the MFP 100 is completed, the user depresses the color start key 406 without changing the read-setting of the MFP 100. The MFP 100 issues a "Scan Available Event" command compliant with the WSD API to the PC 200 (S1206). Based on the information, the application 700 specifies the MFP 100 and the type of push event issued. In this embodiment, the specified MFP 100 and the type of push event are compared to the device and the type of push event that have previously been stored in the memory 204 or the like. As a result of comparison, if the device and the type of event are determined to be the same, the application 700 transmits a scan request to the MFP 100 through the network 300 in accordance with the read-setting stored in the memory 204 or the like, based on the push event received in S1201, without making an inquiry about read-setting, thereby instructing scan execution (S1207). In response to the scan request, the MFP 100 executes scanning and transmits scanned data to the PC 200 through the network 300 (S1208).

In a case where the read-setting is different, such as a case where a user depresses the color start key and a case where the user depresses the monochrome start key on the MFP 100, the PC 200 can recognize different types of issued push events by configuring different event GUIDs. As described above, in the present embodiment, when the push event transmitted in S1201 and the push event transmitted in S1206 are compared and determined to be the same, the application 700 does not transmit an inquiry about read-setting to the MFP 100. As a result, it is possible for the PC 200 to reduce time before scanned data acquisition from the MFP 100. Note that the read-setting stored in the memory 204 may have limitation on the validity period. By placing limitation on the validity period, it is possible to prevent scanning execution with unintended read-setting, for instance, when a different user operates the MFP 100.

Fourth Embodiment

Figure 13:
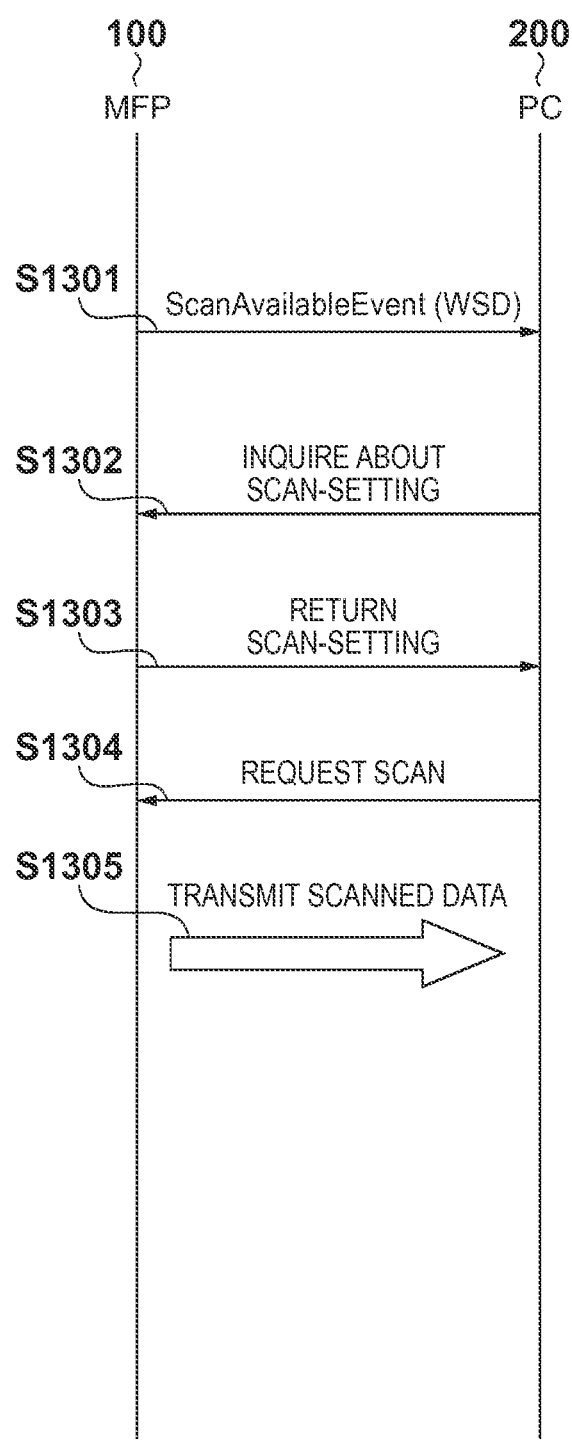
FIG. 13 is a view showing a procedure of push scanning according to the fourth embodiment.
Figure 14:
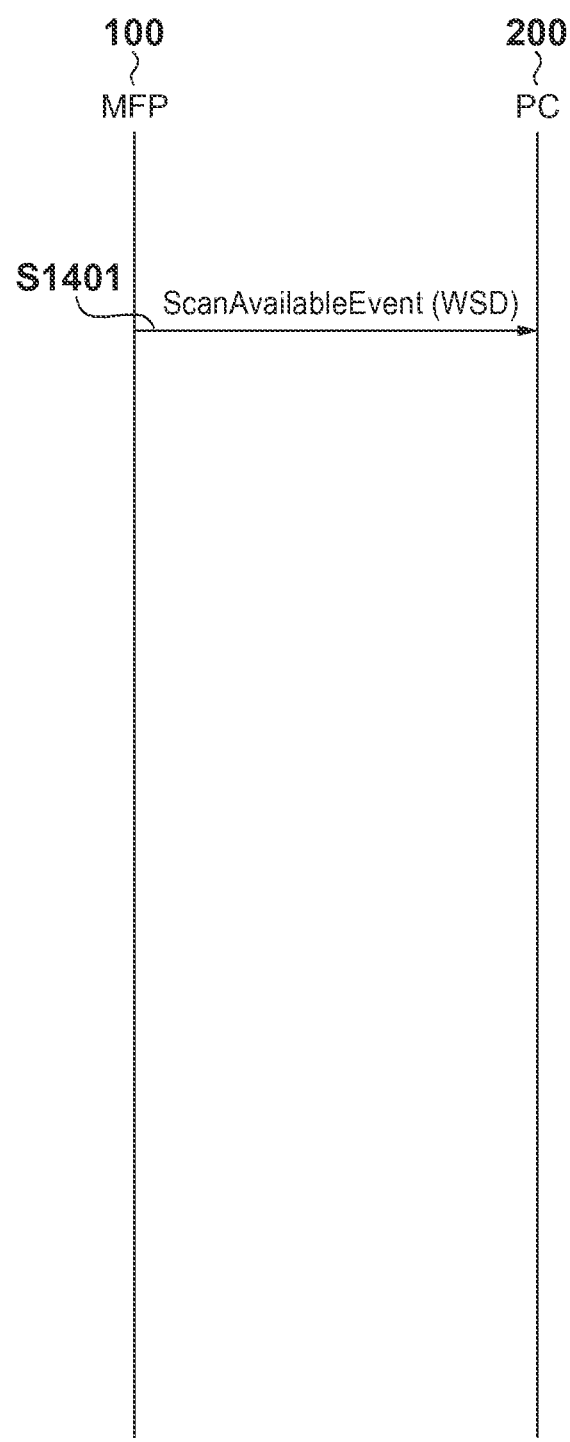
FIG. 14 is a view showing a procedure in a case where an inquiry is not transmitted.
Figure 17:
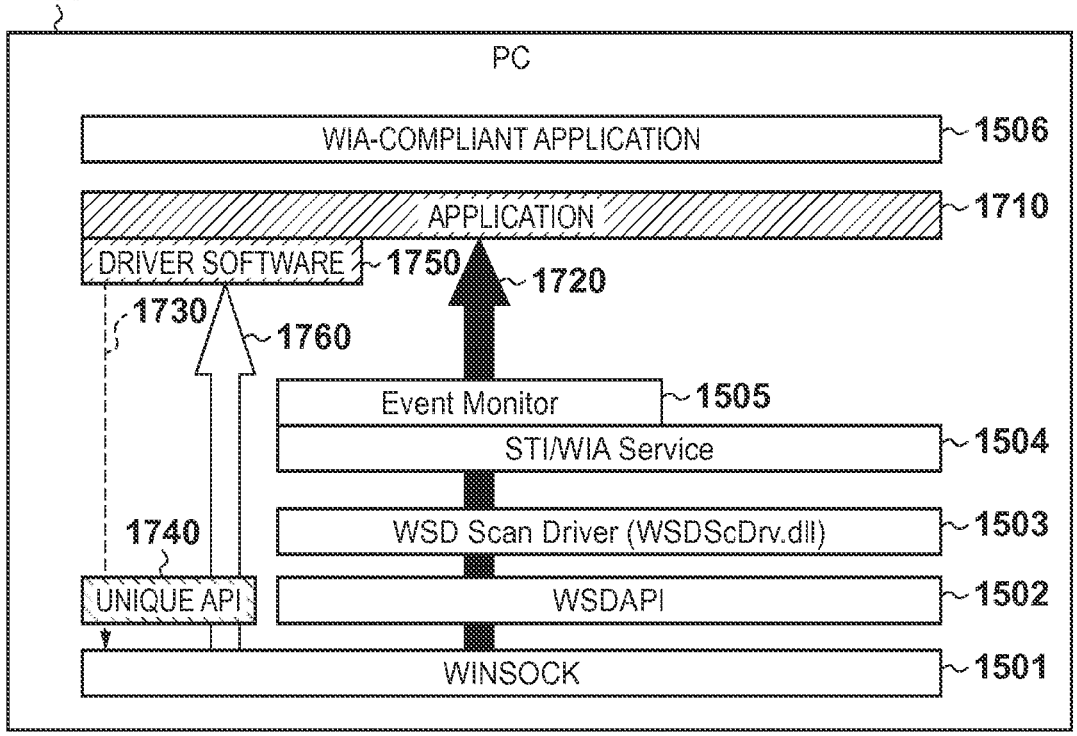
FIG. 17 is a brief view showing a software module configuration according to the fourth embodiment.

FIG. 13 is a flowchart showing a procedure of push scanning performed between the MFP 100 and the PC 200 according to the fourth embodiment. The present embodiment differs from the first embodiment in that, when the PC 200 receives a push event from the MFP 100, the PC 200 determines whether or not to make an inquiry about read-setting in accordance with a determination result of whether or not a scanner driver other than the WSD-standard scanner driver, such as TWAIN driver software, has already been installed. FIG. 14 is a flowchart showing a case where the PC 200 does not make an inquiry in response to a push event. FIG. 17 is a brief view showing a module configuration of software in the PC 200 used in scanning according to the present embodiment. An application 1710 is allocated to a push event 1720. When the application 1710 detects a push event 1720, the application 1710 makes an inquiry about read-setting through a unique API 1740 (1730). In place of the unique API 1740, an inquiry may be made through the WSD API 1502. When read-setting is acquired, driver software 1750 transmits a scan request according to the read-setting, and acquires scanned data 1760.

In the first to third embodiments, the WSD Scan driver 1503 uses the application 1510 or 1610 for transmitting a scan request to the MFP 100. However, in the present embodiment, another driver software 1750 shown in FIG. 17 transmits a scan request to the MFP 100 as necessary. Note that the application 1710 and the driver software 1750 may be integrated. However, when the application and driver software are separately provided, the driver software can be apparatus-dependent while the application has a general-purpose configuration. Therefore, it is possible to improve scalability of each software. Herein, assume that one or a plurality of read-setting that can be set on the console panel 400 of the MFP 100 are not supported by the WSD Scan Driver 1503, but supported by the driver software 1750. In a case of performing read processing using the driver software 1750, assume that the driver software 1750 that supports the MFP 100 is pre-installed in the PC 200.

Referring to FIG. 13, a user depresses the scan key 404 on the MFP 100, and selects the setting "personal computer" or "attach" to mail" as a storage destination on the screen 401. The user designates the PC 200 as a scanned-data storage destination, and depresses the color start key 406 or the monochrome start key 407. The MFP 100 issues a "Scan Available Event" command compliant with the WSD API 1502 to the PC 200, and transmits the command to the PC 200 through the network 300 (S1301). The command, which is an OS-standard API, includes a connection device path of the ImageClass and an event GUID.

Based on the information, the application 1710 specifies the MFP 100 and the type of push event issued. Also, the MFP 100 determines whether or not the driver software 1750 has been installed. If it is determined that the driver software 1750 has been installed, all read-setting set in the MFP 100 can be supported by the driver software 1750; therefore, an inquiry about read-setting is transmitted to the MFP 100 through the network 300 (S1302). In response to the read-setting inquiry from the PC 200, the MFP 100 returns a response to the PC 200 through the network 300 regarding read-setting set by the user on the console panel 400 (S1303). The application 1710 starts up the driver software 1750, and the driver software 1750 transmits a scan request according to the read-setting to the MFP 100 through the network 300, thereby instructing scan execution (S1304). In response to the scan request, the MFP 100 starts scan execution, and transmits scanned data to the PC 200 through the network 300 (S1305).

Next, the flowchart in FIG. 14 is described. Assume that the driver software 1750 that supports the MFP 100 has not been installed before the processing. A user depresses the scan key 404 on the MFP 100, and selects the setting "personal computer" or "attach to mail" as a storage destination on the screen 401. The user designates the PC 200 as a scanned-data storage destination, and depresses the color start key 406 or the monochrome start key 407. The MFP 100 issues a "Scan Available Event" command compliant with the WSD API to the PC 200, and transmits the command to the PC 200 through the network 300 (S1401). Based on the information, the application 1710 specifies the device and the type of push event issued. Also, the MFP 100 determines whether or not the driver software 1750 has been installed. If it is determined that the driver software 1750 has not been installed, an inquiry about read-setting is not performed because the read-setting may include setting that is not supported by the WSD Scan Driver 1503.

Although the aforementioned embodiment has described an example where processing ends without transmitting an inquiry, the embodiment may be so configured that the application 1710 displays a user interface of the WSD Scan Driver 1503 for allowing a user to select read-setting, or that scanning is executed with default-setting of the WSD Scan Driver 1503. Furthermore, the present embodiment assumes that, when the PC 200 including the driver software 1750 receives a push event, read processing is performed with the use of the driver software 1750; however, the present invention is not limited to this. For instance, if read-setting designated by the MFP 100 can be handled by the WSD Scan Driver 1503, read processing may be performed with the use of the WSD Scan Driver 1503 even if the driver software 1750 is installed. Alternatively, an embodiment may be so configured that scanner drivers are selectable.

According to the above-described various embodiments, when a WSD push scan is to be performed, the setting designated by a user in the reading apparatus is notified to the PC, and the PC can have the reading apparatus execute image reading by giving a read instruction that reflects the designated setting. Accordingly, it is possible to realize reading in WSD push scanning with the setting desired by a user of the reading apparatus. Furthermore, because the above embodiments adopt the event method instead of the polling method that performs periodic polling from the PC, a traffic increase on the network does not occur. Note that the above-described various embodiments may be combined appropriately for implementation.

Other Embodiments

Aspects of the present invention can also be realized by a computer or a plurality of computers of a system or apparatus (or devices such as a CPU or MPU) that reads out and executes a program recorded on a memory device to perform at least a art of the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-050950, filed Mar. 7, 2012, which is hereby incorporated by reference herein in its entirety.

What is claimed is:

1. An information processing apparatus capable of communication with a reading apparatus through a network, comprising:
a reception unit configured to receive, through a network, a notification indicating that a read-start instruction is inputted in the reading apparatus
an inquiring unit configured to transmit an inquiry to acquire a read-setting of read operation corresponding to the read-start instruction to the reading apparatus, in a case where the notification is received by said reception unit;
an acquisition unit configured to acquire the read-setting as a response of the inquiry; and
an instruction unit configured to transmit an instruction to read an image in accordance with the read-setting acquired by said acquisition unit to the reading apparatus, using a predetermined scanner driver,
wherein image data generated by reading the image in accordance with the instruction transmitted by said instruction unit is received in the information processing apparatus,
wherein at least one of said reception unit, said inquiring unit, said acquisition unit, and said instruction unit is executed by a CPU.

2. The apparatus according to claim 1, further comprising a determination unit configured to determine whether or not the read-setting is to be acquired by said acquisition unit,
wherein in a case where said determination unit determines that the read-setting is to be acquired, said acquisition unit acquires the read-setting from the reading apparatus.

3. The apparatus according to claim 2, wherein in a case where said determination unit determines that the read-setting is not to be acquired by said acquisition unit, said instruction unit instructs the reading apparatus to execute reading with a predetermined read-setting which is set in the predetermined scanner driver.

4. The apparatus according to claim 2, wherein said determination unit determines whether or not the read-setting is to be acquired from the reading apparatus in accordance with the notification received by said reception unit.

5. The apparatus according to claim 2, further comprising:
a first storage unit configured to store the notification received by said reception unit;
a second storage unit configured to store the read-setting acquired by said acquisition unit; and
a second determination unit configured to determine, in a case where said reception unit receives a new notification, whether or not the new notification is the same as the notification that has been stored in said first storage unit,
wherein in a case where said second determination unit determines that the new notification is the same as the notification, acquisition of the read-setting by said acquisition unit is not performed in accordance with reception of the new notification, and said instruction unit instructs the reading apparatus to read an image with the read-setting stored in said second storage unit and transmit read image data generated by reading the image.

6. The apparatus according to claim 2, wherein said determination unit determines whether or not to acquire the read-setting from the reading apparatus in accordance with a scanner driver to be used.

7. The apparatus according to claim 1, wherein said instruction unit switches a scanner driver into the predetermined scanner driver to be used in accordance with the notification received by said reception unit.

8. The apparatus according to claim 1, wherein said reception unit receives the notification according to Web Services on Devices.

9. The apparatus according to claim 1, wherein the predetermined scanner driver is a WSD (Web Services on Devices)-standard scanner driver.

10. A control method of an information processing apparatus, which is implemented in an information processing apparatus capable of communication with a reading apparatus through a network, comprising the steps of:
   receiving, through a network, a notification indicating that a read-start instruction is inputted in the reading apparatus;
   transmitting an inquiry to acquire a read-setting of read operation corresponding to the read-start instruction to the reading apparatus, in a case where the notification is received in the receiving;
   acquiring the read-setting as a response of the inquiry; and
   transmitting an instruction to read an image in accordance with the acquired read-setting acquired in the acquiring, to the reading apparatus, using a predetermined scanner driver,
   wherein image data generated by reading the image in accordance with the instruction transmitted is received in the information processing apparatus.

11. The control method according to claim 10, further comprising determining whether or not the read-setting is to be acquired from the reading apparatus,
   wherein in a case where it is determined that the read-setting is to be acquired, the read-setting is acquired from the reading apparatus.

12. The control method according to claim 11, wherein in a case where it is determined that the read-setting is not to be acquired from the reading apparatus, instructing the reading apparatus to execute reading with a predetermined read-setting which is set in the predetermined scanner driver.

13. The control method according to claim 11, wherein the determining is performed in accordance with the received notification.

14. The control method according to claim 11, wherein the determining is performed in accordance with a scanner driver to be used.

15. The control method according to claim 11, further comprising:
   storing the received notification and the acquired read-setting in a storage unit; and
   determining whether or not a new notification is the same as the notification that has been stored in the storage unit,
   wherein in a case where it is determined that the new notification is the same as the notification, acquisition of the read-setting from the reading apparatus is not performed in accordance with the new notification, and the reading apparatus is instructed to perform reading with the read-setting stored in the storage unit.

16. The control method according to claim 10, wherein the predetermined scanner driver to be used in the instruction is determined in accordance with the received notification.

17. The control method according to claim 10, wherein the notification is received according to Web Services on Devices.

18. The method according to claim 10, wherein the predetermined scanner driver is a WSD (Web Services on Devices)-standard scanner driver.

19. A non-transitory storage medium storing a computer-readable program which causes a computer to execute processing comprising the steps of:
   receiving, through a network, a notification indicating that a read-start instruction is inputted in a reading apparatus;
   transmitting an inquiry to acquire a read-setting of read operation corresponding to the read-start instruction to the reading apparatus, in a case where the notification is received in the receiving;
   acquiring the read-setting as a response of the inquiry; and
   transmitting an instruction to read an image in accordance with the acquired read-setting to the reading apparatus, using a predetermined scanner driver,
   wherein image data generated by reading the image in accordance with the instruction transmitted is received in an information processing apparatus capable of communicating with the reading apparatus through a network.

20. The medium according to claim 19, wherein the predetermined scanner driver is a WSD (Web Services on Devices)-standard scanner driver.

* * * * *